(12) United States Patent
Rosenzweig et al.

(10) Patent No.: US 9,612,652 B2
(45) Date of Patent: Apr. 4, 2017

(54) CONTROLLING POWER CONSUMPTION BY POWER MANAGEMENT LINK

(71) Applicant: Intel Corporation, Santa Clara, CA (US)

(72) Inventors: Nir Rosenzweig, Givat Elia (IL); Efraim Rotem, Haifa (IL); Jawad Haj-Yihia, Haifa (IL); Ohad Falik, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 13/631,907

(22) Filed: Sep. 29, 2012

(65) Prior Publication Data

US 2014/0095911 A1    Apr. 3, 2014

(51) Int. Cl.
*G06F 1/00* (2006.01)
*G06F 1/32* (2006.01)

(52) U.S. Cl.
CPC .......... *G06F 1/3296* (2013.01); *G06F 1/3203* (2013.01); *G06F 1/3209* (2013.01); *G06F 1/3215* (2013.01); *G06F 1/3287* (2013.01); *Y02B 60/1282* (2013.01)

(58) Field of Classification Search
CPC ..... G06F 1/3203; G06F 1/3215; G06F 1/3287
See application file for complete search history.

(56) References Cited

U.S. PATENT DOCUMENTS

| 5,878,264 | A  | * | 3/1999 | Ebrahim ...................... 713/323 |
| 8,375,234 | B2 | * | 2/2013 | Schramm et al. ............ 713/324 |
| 2002/0083349 | A1 | * | 6/2002 | Khatri ................... G06F 1/3215 713/300 |
| 2005/0160196 | A1 | * | 7/2005 | Dutton et al. .................. 710/10 |
| 2006/0053326 | A1 | * | 3/2006 | Naveh .................. G06F 1/3203 713/323 |
| 2009/0031156 | A1 | * | 1/2009 | Barth .................... G06F 1/3203 713/323 |
| 2009/0210734 | A1 | * | 8/2009 | Schramm et al. ............ 713/324 |
| 2010/0169683 | A1 | * | 7/2010 | Wang et al. .................. 713/323 |
| 2012/0102346 | A1 | * | 4/2012 | Haj-Yihia ..................... 713/322 |
| 2013/0007489 | A1 | * | 1/2013 | Unnikrishnan ....... G06F 1/3209 713/320 |
| 2013/0103961 | A1 | * | 4/2013 | Brooks et al. ................ 713/320 |

* cited by examiner

*Primary Examiner* — Mohammed Rehman
*Assistant Examiner* — Gayathri Sampath
(74) *Attorney, Agent, or Firm* — Alpine Technology Law Group LLC

(57) ABSTRACT

Methods and apparatus relating to controlling power consumption by a power management link are described. In one embodiment, the physical interface of a power management (PM) link is shut down when a processor is in a sleep state (e.g., to conserve power), while maintaining the availability of the processor for communication to a (e.g., embedded) controller over the PM link. Other embodiments are also disclosed and claimed.

30 Claims, 8 Drawing Sheets

CONTROLLING POWER CONSUMPTION BY POWER MANAGEMENT LINK

FIELD

The present disclosure generally relates to the field of electronics. More particularly, an embodiment of the invention relates to controlling power consumption by a power management link.

BACKGROUND

As integrated circuit (IC) fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may damage an IC chip by, for example, thermal expansion. Also, the additional heat may limit usage locations and/or usage applications of a computing device that includes such chips.

For example, a portable computing device may solely rely on battery power for its operations. Hence, as additional functionality is integrated into portable computing devices, the need to reduce power consumption becomes increasingly important, for example, to maintain battery power for an extended period of time. Non-portable computing systems also face cooling and power generation issues as their IC components use more power and generate more heat.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Modern computer platforms, both mobile and server, may implement an Embedded Controller (EC) on a platform to perform power management functions. Mobile platforms may use an EC (which may also be used as the keyboard controller) for local management while servers may use node managers to perform both local and global management functions. These embedded controllers may in turn use a dedicated Power Management (PM) link between a processor or CPU (Central Processing Unit) and an outward element (such as an EC) to communicate power management related commands or signals.

Moreover, in modern CPUs, the CPU is one of the main power consumers. One way to reduce this power consumption in idle is to shut down various parts of the CPU while idle. Among the functions that are disconnected may be the clock domains and voltages. However, the clock and voltage domain might be needed to govern the PM link, making it physically unavailable. Keeping voltage and clock running just to keep the link functionality may consume unnecessary power and reduce the effectiveness of the power management functionality.

Some of the embodiments discussed herein may provide efficient and flexible power management for computing systems and/or processors (including general-purpose processors, graphics processors, network processors, etc.). In an embodiment, the physical interface of a PM link is shut down when a processor (or CPU) is in a sleep state (e.g., to conserve power), while maintaining the availability of the processor for communication to an EC over the PM link.

In an embodiment, signal(s) and/or command(s) may be communicated from a CPU to a power management logic (such as an EC or node manager), e.g., including physical signal(s) or command(s)/message(s) on some existing bus or a sideband channel. In some embodiments, as will be further discussed herein, energy efficiency calculation may be performed between waking up the CPU and delaying the accesses before waking a CPU from sleep state.

Figure 1:
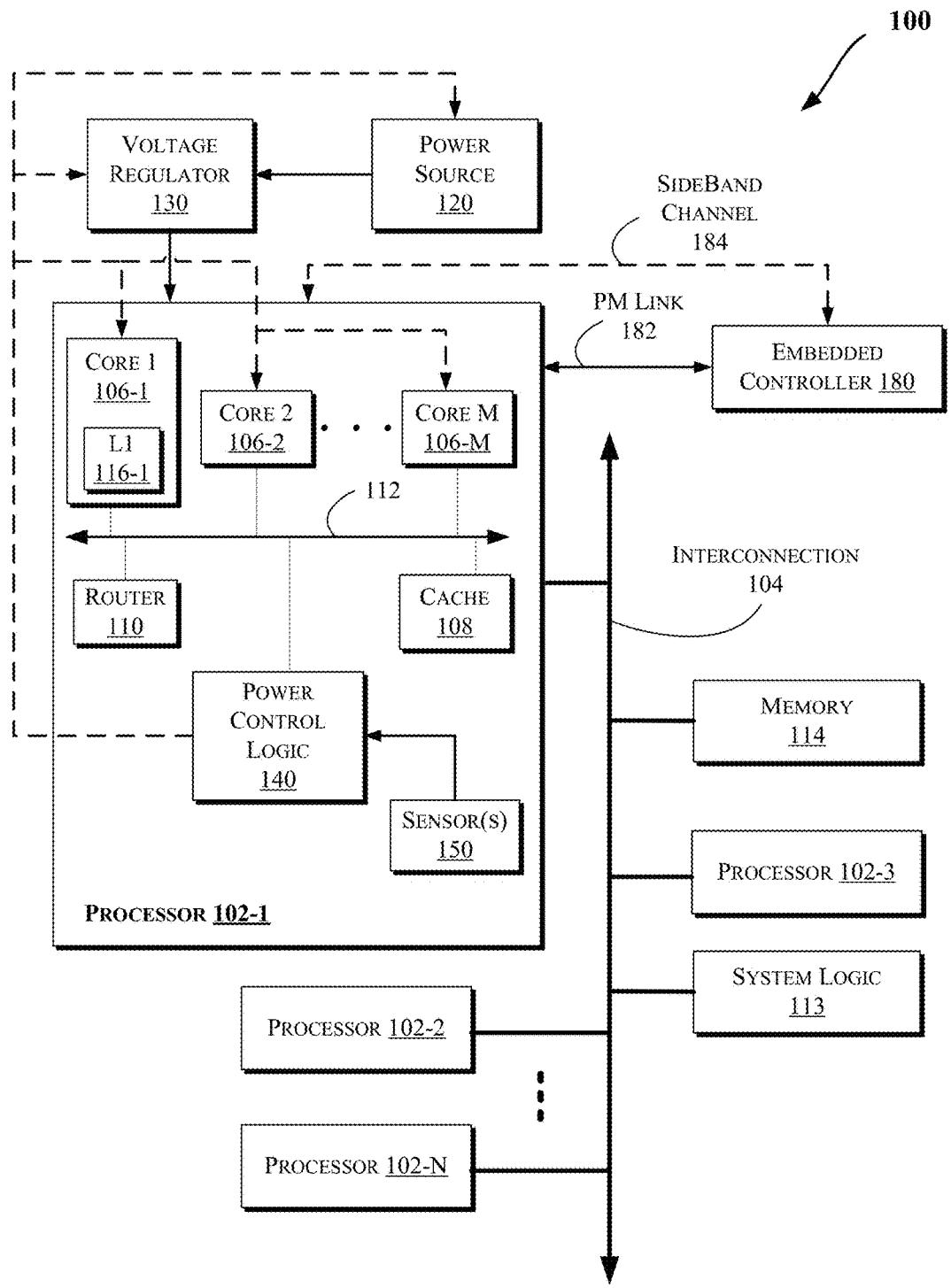
FIGS. 1, 7, and 8 illustrate block diagrams of embodiments of computing systems, which may be utilized to implement various embodiments discussed herein.

Moreover, some embodiments may be applied in computing systems that include one or more processors (e.g., with one or more processor cores), such as those discussed with reference to FIGS. 1-8, including for example mobile computing devices such as smart phones, tablets, portable game consoles, etc. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 7-8), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub. Moreover, some embodiments include system logic 113 that may perform various system control functions. In various embodiments, the system logic 113 can be integrated into the processor 102 and/or be coupled to the interconnect 104. Also, signals 182 and/or 184 may be coupled to the system logic 113 (which may be an existing system logic that has dual purpose, or is otherwise repurposed, to support various operations discussed herein including the operations of the Embedded Controller 180). The signals 182 and 184 may be coupled to the logic 113 instead of or in addition to being coupled to the EC 180.

The system 100 may also include a power source 120 (e.g., a direct current (DC) power source or an alternating current (AC) power source) to provide power to one or more components of the system 100. In some embodiments, the power source 120 may include one or more battery packs and/or power supplies. The power source 120 may be coupled to components of system 100 through a voltage regulator (VR) 130.

Moreover, even though FIG. 1 illustrates one power source 120 and one voltage regulator 130, additional power sources and/or voltage regulators may be utilized. For example, each of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, the processor 102 may further include a power control logic 140 to control supply of power to components of the processor 102 (e.g., cores 106). Logic 140 may have access to one or more storage devices discussed herein (such as cache 108, L1 cache 116, memory 114, or another memory in system 100) to store information relating to operations of logic 140 such as information communicated with various components of system 100 as discussed here. Also, as shown, the logic 140 may be coupled to the VR 130 and/or other components of system 100 such as the cores 106 and/or the power source 120.

For example, the logic 140 may be coupled to receive information (e.g., in the form of one or more bits or signals) to indicate status of one or more sensors 150 (where the sensor(s) 150 may be provided proximate to components of system 100 (or other computing systems discussed herein such as those discussed with reference to other figures including 7 and 8, for example), such as the cores 106, interconnections 104 or 112, etc., to sense variations in various factors affecting power/thermal behavior of the system, such as temperature, operating current, operating frequency, operating voltage, power consumption, inter-core communication activity, etc.).

Furthermore, the logic 140 may instruct the VR 130, power source 120, and/or individual components of system 100 (such as the cores 106) to modify their operations. For example, logic 140 may indicate to the VR 130 and/or power source 120 to adjust their output. In some embodiments, logic 140 may request the cores 106 to modify their operating frequency, operating current, operating voltage, power consumption, etc.

Also, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, etc. Furthermore, as shown in FIG. 1, the power source 120 and/or the voltage regulator 130 may communicate with the power control logic 140 and report their power specification and/or status.

As illustrated in FIG. 1, the processor 102 may be coupled to an Embedded Controller (EC) 180 via a PM link 182. EC 180 may also communicate with the processor through a sideband channel 184 (either directly or via other components in a computing system such as a Platform Controller Hub (PCH), including those discussed with reference to FIG. 2-3 or 6, for example). Also, the EC 180 may be provided as an integrated ME (Management Engine) on a PCH.

In an embodiment, a CPU (such as processor 102) and an outward element (such as EC 180) may synchronize a PM link (such as PM link 182) and maintain Quality of Service (QoS) even when the PM link is down; effectively, turning the PM link physically off and maintaining it logically on. As will be further discussed herein, the following two options may be used: (1) arbitration through a side band (see, e.g., FIG. 2, 3, or 6); or (2) detection and wakeup (see, e.g., FIG. 4 or 5). In an embodiment, the sideband channel 184 can be implemented as a logical signal that is provided or encoded on the same physical PM link 182. For example, the encoding can be done physically (e.g., over an existing signal or channel) by pulling up/down a signal to a predefined value, other electrical signaling, or via a data packet, etc., see, e.g., FIG. 2B.

Figure 2:
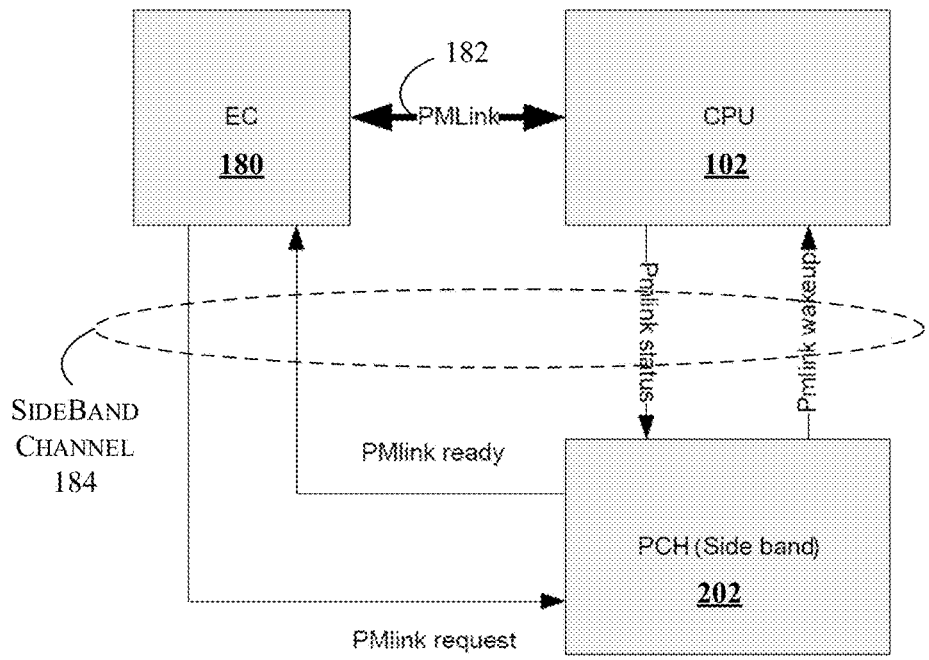
FIGS. 2, 2B, 2C, 4, and 6 illustrate block diagrams of computing system components, according to some embodiments of invention.

FIG. 2 illustrates a block diagram of components of a computing system to perform power management link arbitration through a sideband, according to an embodiment. In one embodiment, an agent such as a PCH 202 acts as mediator between the CPU (also referred to herein interchangeably as a "processor") 102 and the EC 180.

As illustrated, the CPU 102 lets the agent (e.g., PCH 202) know when the PM link 182 is down (e.g., via a PMlink status signal) and report that to the EC 180 (e.g., via a PMlink ready signal). When the EC 180 needs to communicate with the CPU 102 while the CPU 102 sleeps, EC 180 will ask the PCH 202 to wake up the CPU 102 (e.g., via a PMlink request signal and PMlink wakeup signal). Then, the EC 180 will wait until the PCH 202 reports that the PMlink is ready (e.g., via the PMlink ready signal), and only then will the EC 180 communicate with the CPU 102, e.g., to reduce any potential errors associate with communicating with the CPU while it is non-function/asleep.

Figure 2B:
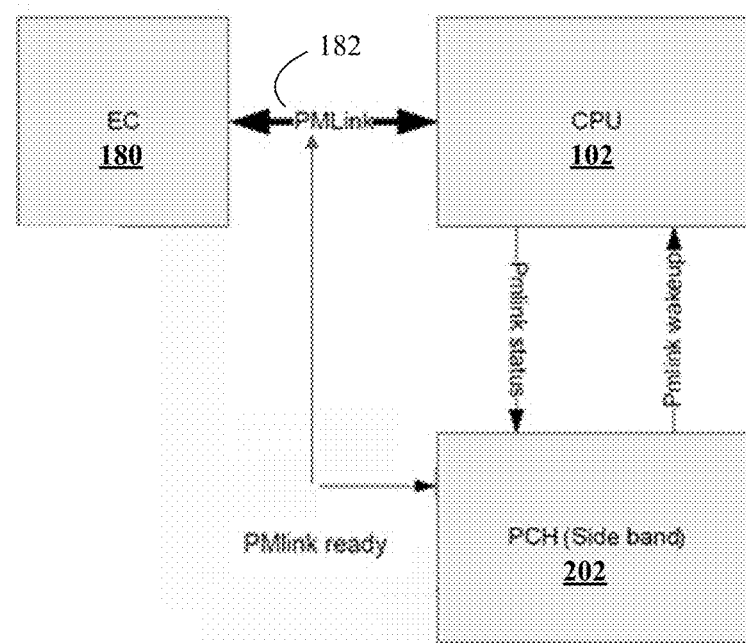
Figure 2C:
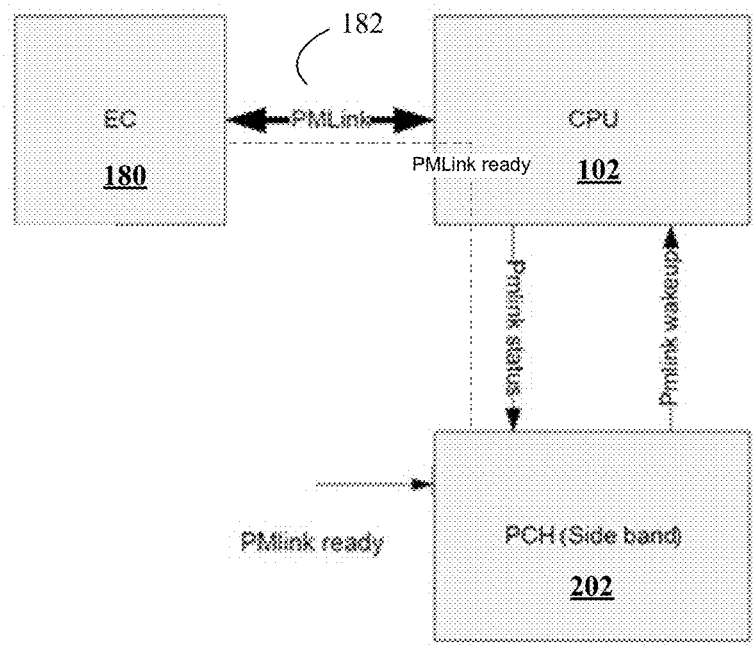

FIGS. 2B and 2C illustrate block diagrams of components of a computing system to perform power management link arbitration through a sideband, according to some embodiments. FIG. 2B indicates that PMlink ready may be provided through the MPLink 182 (e.g., when compared to FIG. 2) and FIG. 2C indicates that MPLink ready may be provided externally (e.g., through dual purpose signals where the side band functionality can in one example pull down/up a pin of the link to be woken up) and/or through MPLink 182 via a data packet, for example.

Figure 3:
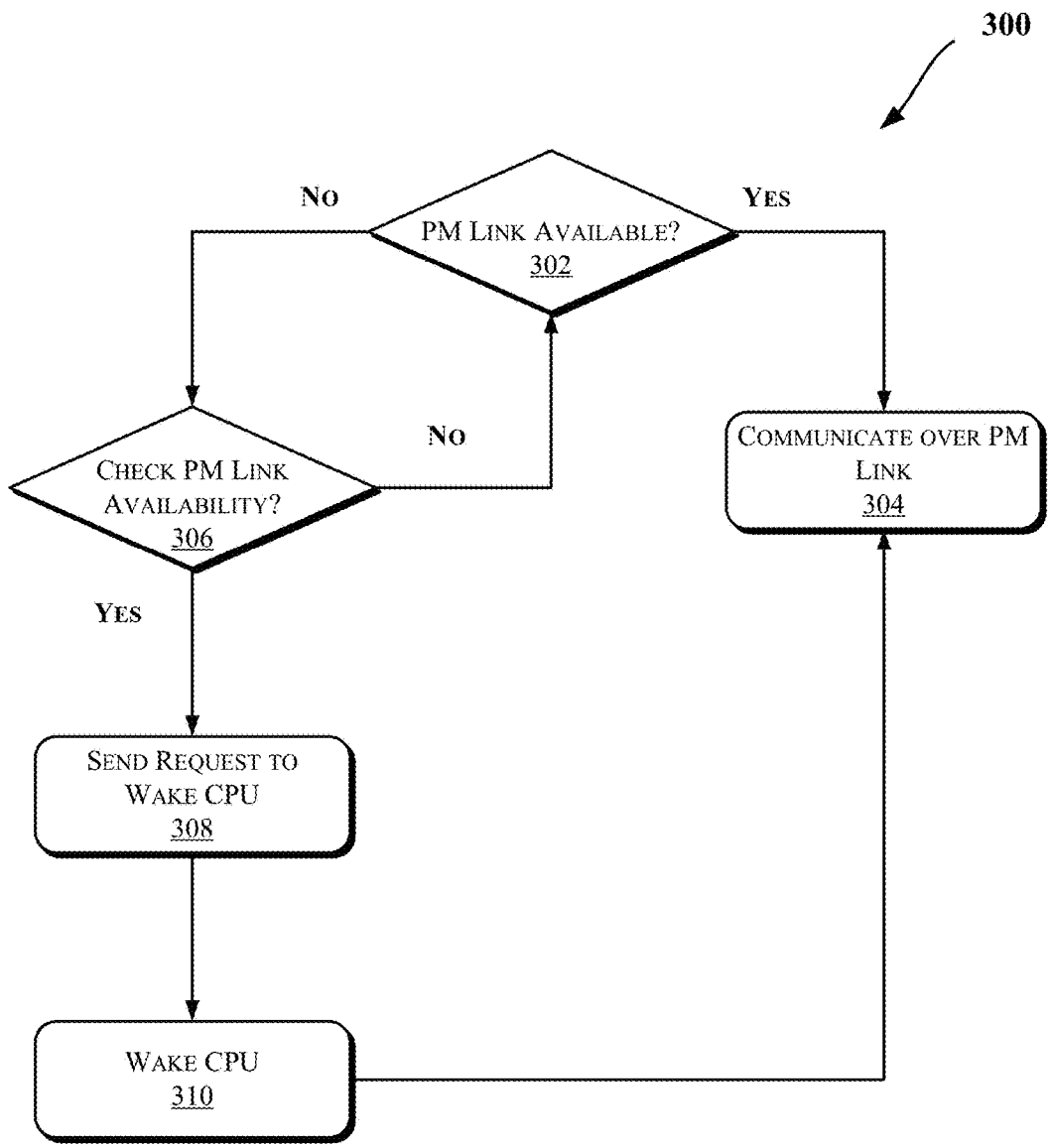
FIGS. 3 and 5 illustrate flow diagrams according to some embodiments.

FIG. 3 illustrates a flow diagram of an embodiment of a method 300 to perform power management link arbitration through a sideband, according to an embodiment. In an embodiment, various components discussed with reference to FIGS. 1-2 and 6-8 may be utilized to perform one or more of the operations discussed with reference to FIG. 3.

Referring to FIGS. 2-3, at an operation 302, an EC (e.g., EC 180) checks for PM link availability (e.g., based on a status of the MPlink ready signal via a PCH (e.g., PCH 202)). If available, the EC communicates with the CPU over the PM link (e.g., PMLink 182) at an operation 304. If unavailable, the EC may evaluate the request to check for PM link availability and determines/checks if it is urgent enough to wake the CPU (e.g., based on a threshold value such as how long the CPU has been in sleep state, how long the CPU needs to stay in a sleep state, how much longer EC can wait before communicating over the PM link (e.g., based on QoS thresholds/consideration), etc.) at an operation 306. The values (such as the threshold values) discussed herein may be stored in a storage device/memory (such as those discussed herein, e.g., with reference to FIG. 1, 7, or 8). For example, the EC may include logic to calculate and compare the amount of energy consumption associated with waking the CPU against the benefit of the power management feature being activated.

Figure 6:
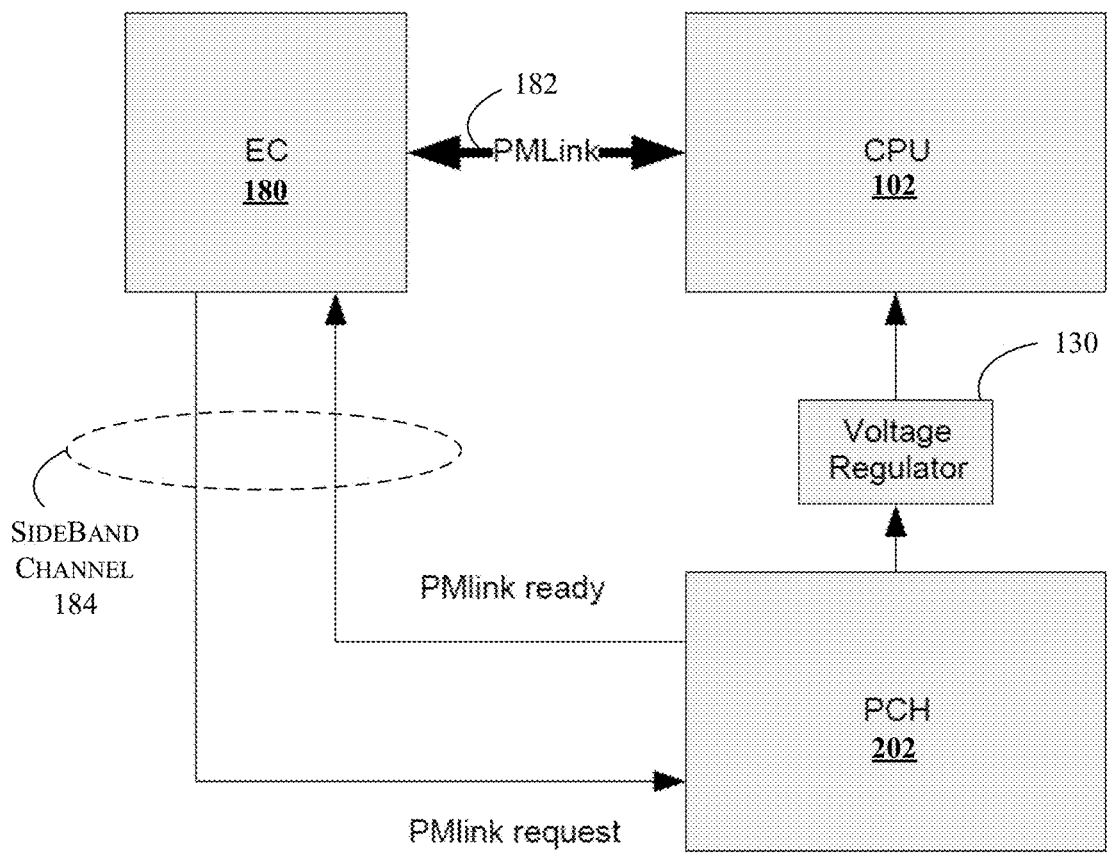

At operation 306, if the EC chooses to wake up the CPU (e.g., if the benefit of the power management feature being activated is higher than the amount of the energy consumption to wake the CPU), it sends a request to the PCH (e.g., via a PMlink request signal) at an operation 308. In turn, the PCH wakes the CPU (e.g., either logically via a PMlink wakeup signal or physically by turning on voltages (e.g., by causing a change in operation of the voltage regulator 130 as shown in FIG. 6) at an operation 310. When the PM link is available, this status may be shown via a sideband (e.g., sideband channel 184, based on the status of the PMlink ready signal). The EC would then send the message on the PM link at operation 304.

Figure 4:
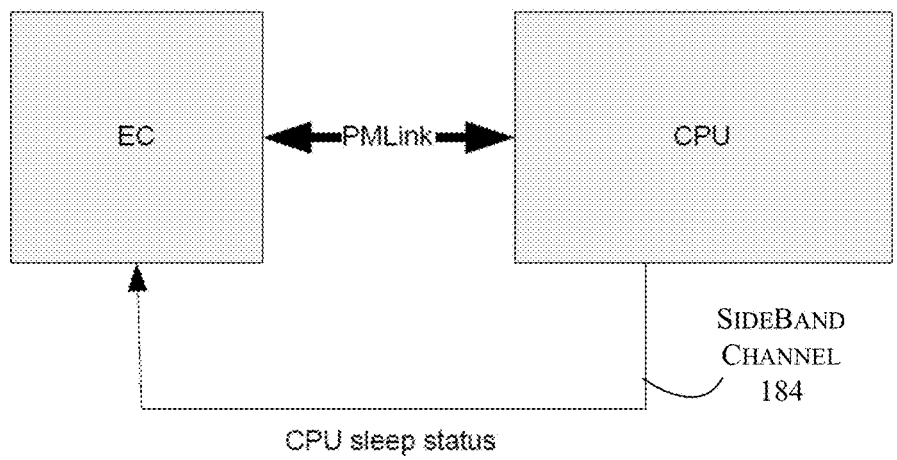

FIG. 4 illustrates a block diagram of components of a computing system to perform power management link detection and wakeup via retires, according to an embodiment. In one embodiment, an EC (e.g., EC 180) sends a request on a PM link (e.g., PM link 182). A CPU (e.g., CPU 102) may include detector logic which would detect the activity on the PM link, and would wake up the CPU to handle the request from the EC. The EC may periodically try to communicate with the CPU until the CPU wakes up and responds.

In an embodiment, the EC may determine the sleep status of the CPU by a side channel (e.g., sideband channel 184, based on the status of the PMlink ready signal). This is done so that the CPU would not be woken up too frequently by the EC, e.g., only when the EC truly needs the CPU's response (e.g., based on QoS thresholds/consideration), etc. For example, the EC may include logic to calculate if the energy of waking the CPU is lower than the benefit of the power management feature being activated, e.g., as discussed with reference to FIG. 3.

Figure 5:
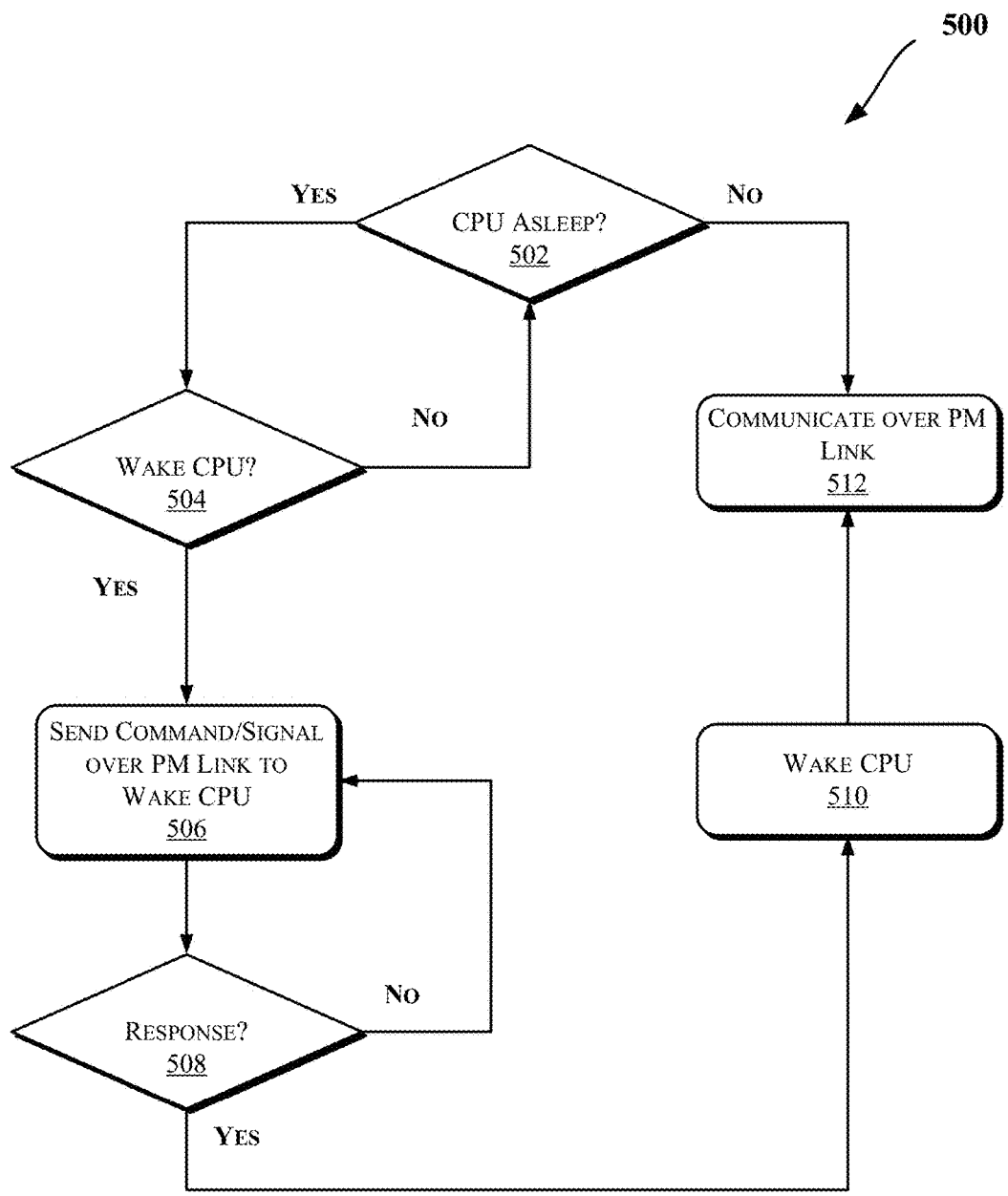

FIG. 5 illustrates a flow diagram of an embodiment of a method 500 to perform power management link detection and wakeup via retires, according to an embodiment. In an embodiment, various components discussed with reference to FIGS. 1-2, 4, and 7-8 may be utilized to perform one or more of the operations discussed with reference to FIG. 5.

Referring to FIGS. 4-5, at an operation 502, an EC (e.g., EC 180) checks for status of a CPU (e.g., CPU 102) over a sideband (such as sideband channel 184, e.g., based on a status of the CPU sleep statues signal). If CPU is asleep, logic (e.g., within or coupled to the EC) evaluates the need to wake up the CPU (e.g., based on a threshold value such as how long the CPU has been in sleep state, how much longer EC can wait before communicating over the PM link (e.g., based on QoS thresholds/consideration), etc.) at an operation 504.

At operation 504, if the EC chooses to wake up the CPU, then the EC sends a regular command/signal over the PM link at an operation 506. This command/signal may not receive a response immediately and the EC may periodically send the command/signal until a response is received at an operation 508. For example, a detector logic on the CPU (or coupled to the CPU) would detect the activity on the PM link and would cause the CPU to wake up at an operation 510.

In an embodiment, the CPU may wait until it is ready (e.g., a threshold time value has passed (for example, based on expiration of a timer (not shown), how long the CPU has been in sleep state, how much longer EC can wait before communicating over the PM link (for example, based on QoS thresholds/consideration, etc.)). Further, the CPU may wait until the PM link is idle in an embodiment, and then respond to the next command. The wait for the next command/signal by EC may address potential issues and to avoid a misaligned command/signal or an incomplete command. In some embodiments, the CPU may wait a defined period of time before going back to sleep and the EC retry period could be smaller than the defined period of time. At an operation 512, the EC may communicate over the PM link with the CPU, e.g., if the CPU is awake per operation 502 or once the CPU is woken after operation 510.

In some embodiments, the calculation of and the decision making by the EC regarding how often to wake up the CPU may be made by a logic that perform energy calculation and makes a CPU wakeup decision (where the logic may be included in the EC or otherwise coupled to the EC). Generally, more often wakeups result in possibly better power management but may result in loosing of energy on wake up, while less frequent wakeups save energy as a trade-off.

As discussed with reference to FIG. 3, FIG. 6 illustrates an option of the EC (or an agent in the computing system (e.g., systems discussed with reference to FIG. 1, 7, or 8)) waking up an external voltage source (e.g., voltage regulator 130) to cause the CPU to wake up (e.g., by activating a wake logic in the CPU).

Figure 7:
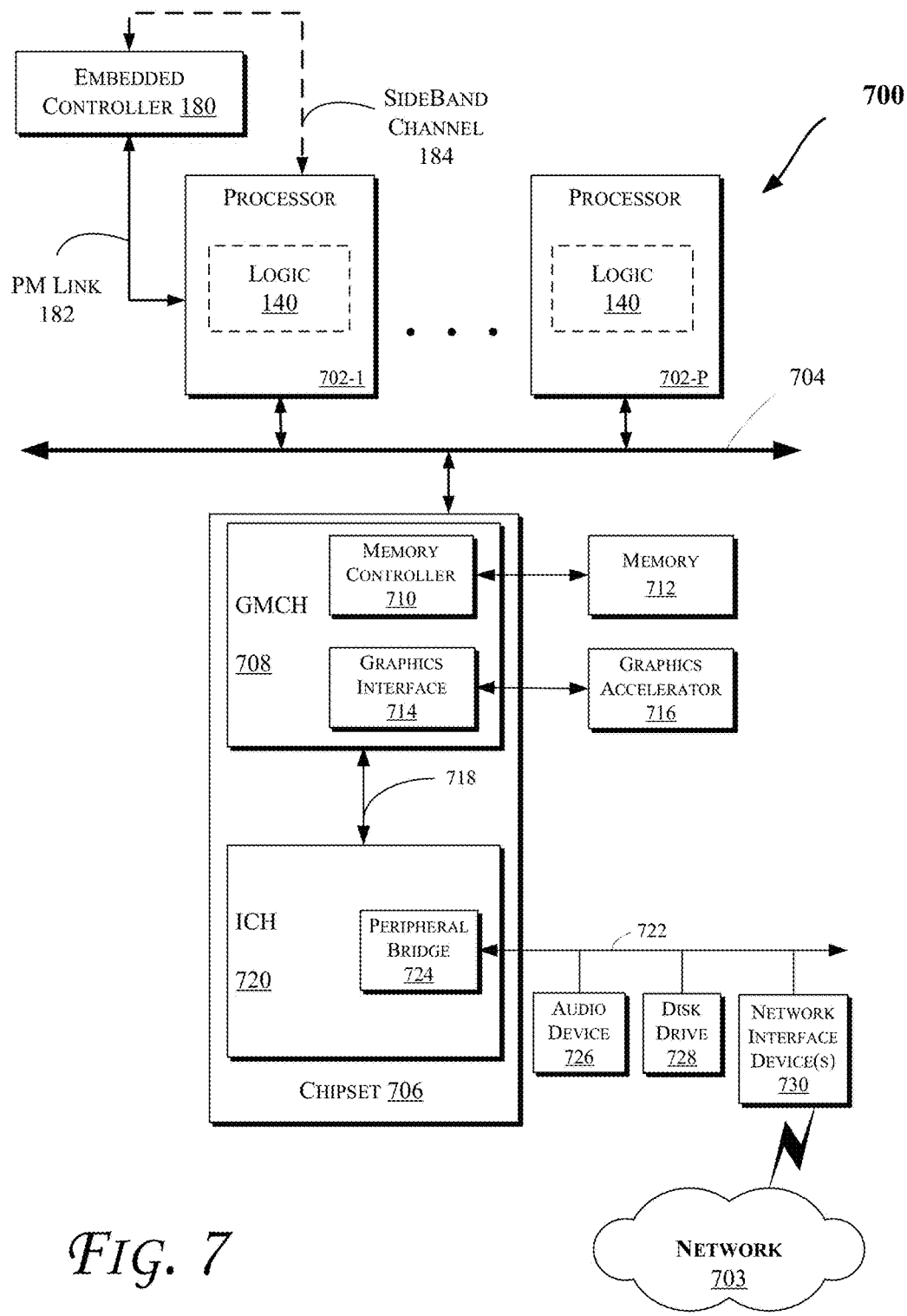

FIG. 7 illustrates a block diagram of a computing system 700 in accordance with an embodiment of the invention. The computing system 700 may include one or more central processing unit(s) (CPUs) or processors 702-1 through 702-P (which may be referred to herein as "processors 702" or "processor 702"). The processors 702 may communicate via an interconnection network (or bus) 704. The processors 702 may include a general purpose processor, a network processor (that processes data communicated over a computer network 703), or other types of a processor (including a reduced instruction set computer (RISC) processor or a complex instruction set computer (CISC)). Moreover, the processors 702 may have a single or multiple core design. The processors 702 with a multiple core design may integrate different types of processor cores on the same integrated circuit (IC) die.

Also, the processors 702 with a multiple core design may be implemented as symmetrical or asymmetrical multiprocessors. In an embodiment, one or more of the processors 702 may be the same or similar to the processors 102 of FIG. 1. In some embodiments, one or more of the processors 702 may include one or more of the cores 106, logic 140, and sensor(s) 150, of FIG. 1. Further, one or more of the processors 702 may be coupled to the EC 180 via the PM link 182 and the sideband channel 184.

Also, the operations discussed with reference to FIGS. 1-6 may be performed by one or more components of the system 700. For example, a voltage regulator (such as VR 130 of FIG. 1) may regulate voltage supplied to one or more components of FIG. 7 at the direction of the logic 140 and/or PCH 202 as discussed with reference to the previous figures.

A chipset 706 may also communicate with the interconnection network 704. The chipset 706 may include a graphics and memory control hub (GMCH) 708. The GMCH 708 may include a memory controller 710 that communicates with a memory 712. The memory 712 may store data, including sequences of instructions that are executed by the processor 702, or any other device included in the computing system 700. In one embodiment of the invention, the memory 712 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 704, such as multiple CPUs and/or multiple system memories.

The GMCH 708 may also include a graphics interface 714 that communicates with a graphics accelerator 716. In one embodiment of the invention, the graphics interface 714 may communicate with the graphics accelerator 716 via an accelerated graphics port (AGP). In an embodiment of the invention, a display (such as a flat panel display, a cathode ray tube (CRT), a projection screen, etc.) may communicate with the graphics interface 714 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 718 may allow the GMCH 708 and an input/output control hub (ICH) 720 to communicate. The ICH 720 may provide an interface to I/O devices that communicate with the computing system 700. The ICH 720 may communicate with a bus 722 through a peripheral bridge (or controller) 724, such as a peripheral component interconnect (PCI) bridge, a universal serial bus (USB) controller, or other types of peripheral bridges or controllers. The bridge 724 may provide a data path between the processor 702 and peripheral devices. Other types of topologies may be utilized. Also, multiple buses may communicate with the ICH 720, e.g., through multiple bridges or controllers. Moreover, other peripherals in communication with the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 722 may communicate with an audio device 726, one or more disk drive(s) 728, and one or more network interface device(s) 730 (which is in communication with the computer network 703). Other devices may communicate via the bus 722. Also, various components (such as the network interface device 730) may communicate with the GMCH 708 in some embodiments of the invention. In addition, the processor 702 and the GMCH 708 may be combined to form a single chip. Furthermore, the graphics accelerator 716 may be included within the GMCH 708 in other embodiments of the invention.

Furthermore, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 700 may be arranged in a point-to-point (PtP) configuration. For example, processors, memory, and/or input/output devices may be interconnected by a number of point-to-point interfaces.

Figure 8:
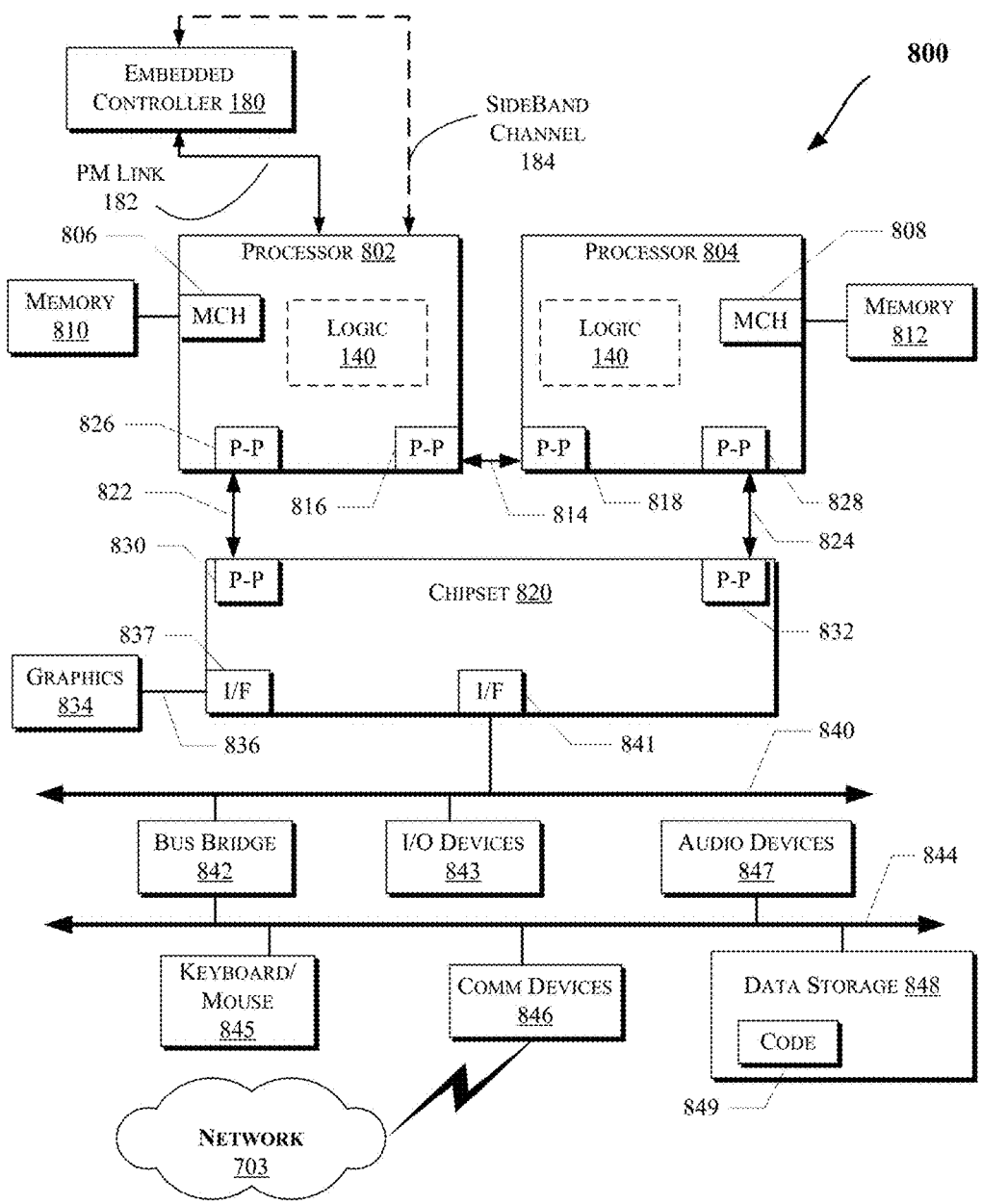

FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-7 may be performed by one or more components of the system 800. Further, one or more of the processors 802/804 may be coupled to the EC 180 via the PM link 182 and the sideband channel 184. Also, a voltage regulator (such as VR 130 of FIG. 1) may regulate voltage supplied to one or more components of FIG. 8 at the direction of the logic 140 and/or PCH 202 as discussed with reference to the previous figures.

As illustrated in FIG. 8, the system 800 may include several processors, of which only two, processors 802 and 804 are shown for clarity. The processors 802 and 804 may each include a local memory controller hub (MCH) 806 and 808 to enable communication with memories 810 and 812. The memories 810 and/or 812 may store various data such as those discussed with reference to the memory 712 of FIG. 7. Also, the processors 802 and 804 may include one or more of the cores 106, logic 140, and/or sensor(s) 150 of FIG. 1.

In an embodiment, the processors 802 and 804 may be one of the processors 702 discussed with reference to FIG. 7. The processors 802 and 804 may exchange data via a point-to-point (PtP) interface 814 using PtP interface circuits 816 and 818, respectively. Also, the processors 802 and 804 may each exchange data with a chipset 820 via individual PtP interfaces 822 and 824 using point-to-point interface circuits 826, 828, 830, and 832. The chipset 820 may further exchange data with a high-performance graphics circuit 834 via a high-performance graphics interface 836, e.g., using a PtP interface circuit 837.

In at least one embodiment, one or more operations discussed with reference to FIGS. 1-8 may be performed by the processors 802 or 804 and/or other components of the system 800 such as those communicating via a bus 840.

Other embodiments of the invention, however, may exist in other circuits, logic units, or devices within the system 800 of FIG. 8. Furthermore, some embodiments of the invention may be distributed throughout several circuits, logic units, or devices illustrated in FIG. 8.

Chipset 820 may communicate with the bus 840 using a PtP interface circuit 841. The bus 840 may have one or more devices that communicate with it, such as a bus bridge 842 and I/O devices 843. Via a bus 844, the bus bridge 842 may communicate with other devices such as a keyboard/mouse 845, communication devices 846 (such as modems, network interface devices, or other communication devices that may communicate with the computer network 603), audio I/O device, and/or a data storage device 848. The data storage device 848 may store code 849 that may be executed by the processors 802 and/or 804.

In various embodiments of the invention, the operations discussed herein, e.g., with reference to FIGS. 1-8, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-8.

Additionally, such (e.g., non-transitory) computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic to determine whether a dedicated power management link, coupled between a processor and an embedded controller, is available for communication based on a wake state of the processor communicated via a sideband channel, coupled between the processor and the embedded controller, wherein the dedicated power management link is to only transmit power management commands or signals;
   logic, at the embedded controller, to determine whether to wake the processor from a sleep state in response to a determination that the processor is in the sleep state;
   logic, at the processor, to detect activity on the dedicated power management link and, in response to detection of the activity, to cause transmission of a request from a platform controller to wake the processor from the sleep state over the sideband channel, wherein the embedded controller is to cause the activity on the dedicated power management link; and
   logic, at the platform controller, to send the request to wake the processor from the sleep state over the sideband channel in response to the determination that the processor is in the sleep state, wherein the platform controller is to couple the processor and the embedded controller over the sideband channel.

2. The apparatus of claim 1, wherein the logic to determine whether to wake the processor is to compare an amount of energy consumption associated with waking the processor with a benefit of a power management feature to be activated by the embedded controller over the power management link.

3. The apparatus of claim 1, wherein a voltage regulator is to couple the platform controller to the processor.

4. The apparatus of claim 1, wherein the logic to send the request to wake the processor from the sleep state is to send a plurality of requests periodically until the processor wakes from the sleep state.

5. The apparatus of claim 1, wherein, in response to the wake request, the processor is to wait until it is ready to exit the sleep state based on a threshold value.

6. The apparatus of claim 1, further comprising logic to detect the request.

7. The apparatus of claim 6, wherein the processor is to comprise the logic to detect the request.

8. The apparatus of claim 1, further comprising one or more sensors to detect variations, corresponding to components of the processor, in one or more of: temperature, operating frequency, operating current, operating voltage, and power consumption.

9. The apparatus of claim 1, wherein one or more of the logic to determine whether the power management link is available, the logic to determine whether to wake the processor, the logic to send the request, and a memory are on a single integrated circuit.

10. The apparatus of claim 1, wherein the sideband channel is to be provided over an existing channel.

11. The apparatus of claim 1, wherein the embedded controller is to be integrated into an existing system logic.

12. A method comprising:
    determining whether a dedicated power management link, coupled between a processor and an embedded controller, is available for communication based on a wake state of the processor communicated via a sideband channel, coupled between the processor and the embedded controller, wherein the dedicated power management link only transmits power management commands or signals;
    determining, at the embedded controller, whether to wake the processor from a sleep state in response to a determination that the processor is in the sleep state;
    detecting, at the processor, activity on the dedicated power management link and, in response to detection of the activity, causing transmission of a request from a platform controller to wake the processor from the sleep state over the sideband channel, wherein the embedded controller causes the activity on the dedicated power management link; and sending, from the platform controller, the request to wake the processor from the sleep state over the sideband channel in response to the determination that the processor is in the sleep state, wherein the platform controller couples the processor and the embedded controller over the sideband channel.

13. The method of claim 12, further comprising comparing an amount of energy consumption associated with waking the processor with a benefit of a power management feature being activated by the embedded controller over the power management link.

14. The method of claim 12, further comprising coupling the platform controller to the processor via a voltage regulator.

15. The method of claim 12, further comprising sending a plurality of requests periodically until the processor wakes from the sleep state.

16. A non-transitory computer-readable medium comprising one or more instructions that when executed on a processor configure the processor to perform one or more operations to cause:

determination of whether a dedicated power management link, coupled between the processor and an embedded controller, is available for communication based on a wake state of the processor communicated via a sideband channel, coupled between the processor and the embedded controller, wherein the dedicated power management link is to only transmit power management commands or signals;

determination, at the embedded controller, of whether to wake the processor from a sleep state in response to a determination that the processor is in the sleep state;

detection, at the processor, of activity on the dedicated power management link and, in response to detection of the activity, cause transmission of a request from a platform controller to wake the processor from the sleep state over the sideband channel, wherein the embedded controller causes the activity on the dedicated power management link; and send, from the platform controller, the request to wake the processor from the sleep state over the sideband channel in response to the determination that the processor is in the sleep state, wherein the platform controller is to couple the processor and the embedded controller over the sideband channel.

17. The non-transitory computer-readable medium of claim 16, further comprising one or more instructions that when executed on the processor configure the processor to perform one or more operations to compare an amount of energy consumption associated with waking the processor with a benefit of a power management feature being activated by the embedded controller over the power management link.

18. The non-transitory computer-readable medium of claim 16, further comprising one or more instructions that when executed on the processor configure the processor to perform one or more operations to send a plurality of requests periodically until the processor wakes from the sleep state.

19. The non-transitory computer-readable medium of claim 16, further comprising one or more instructions that when executed on the processor configure the processor to perform one or more operations to cause the processor to wait until it is ready to exit the sleep state based on a threshold value.

20. The non-transitory computer-readable medium of claim 16, further comprising one or more instructions that when executed on the processor configure the processor to perform one or more operations to detect variations, corresponding to components of the processor, in one or more of: temperature, operating frequency, operating current, operating voltage, and power consumption.

21. A system comprising:
a processor having one or more processor cores;
memory to store a threshold value corresponding to a time period for the processor to stay in a sleep state;
an embedded controller coupled to the processor;
logic to determine whether a dedicated power management link, coupled between the processor and the embedded controller, is available for communication based on a wake state of the processor communicated via a sideband channel, coupled between the processor and the embedded controller, wherein the dedicated power management link is to only transmit power management commands or signals;
logic, at the embedded controller, to determine whether to wake the processor from a sleep state in response to a determination that the processor is in the sleep state;
logic, at the processor, to detect activity on the dedicated power management link and, in response to detection of the activity, to cause transmission of a request from a platform controller to wake the processor from the sleep state over the sideband channel, wherein the embedded controller is to cause the activity on the dedicated power management link; and
logic, at the platform controller, to send the request to wake the processor from the sleep state over the sideband channel in response to the determination that the processor is in the sleep state, wherein the platform controller is to couple the processor and the embedded controller over the sideband channel.

22. The system of claim 21, wherein the logic to determine whether to wake the processor is to compare an amount of energy consumption associated with waking the processor with a benefit of a power management feature activated by the embedded controller over the power management link.

23. The system of claim 21, wherein a voltage regulator is to couple the platform controller to the processor.

24. The system of claim 21, wherein the logic to send the request to wake the processor from the sleep state is to send a plurality of requests periodically until the processor wakes from the sleep state.

25. The system of claim 21, wherein the processor is to wait until it is ready to exit the sleep state based on a threshold value.

26. The system of claim 21, further comprising one or more sensors to detect variations, corresponding to components of the processor, in one or more of: temperature, operating frequency, operating current, operating voltage, and power consumption.

27. The system of claim 21, wherein one or more of the logic to determine whether the power management link is available, the logic to determine whether to wake the processor, the logic to send the request, and a memory are on a single integrated circuit.

28. The apparatus of claim 1, wherein the dedicated power management link is to directly couple the processor and the embedded controller.

29. The apparatus of claim 1, wherein a physical interface of the dedicated power management link is shut down when the processor is in the sleep state.

30. The apparatus of claim 1, wherein the embedded controller is to cause the activity on the dedicated power management link periodically until a response is received.

\* \* \* \* \*